Oct. 29, 1940.   H. ROLAND ET AL   2,219,964
GYRO, AND MORE PARTICULARLY DIRECTIONAL GYRO FOR
NAVIGATION OR VEHICLE CONTROL PURPOSES
Filed May 10, 1939
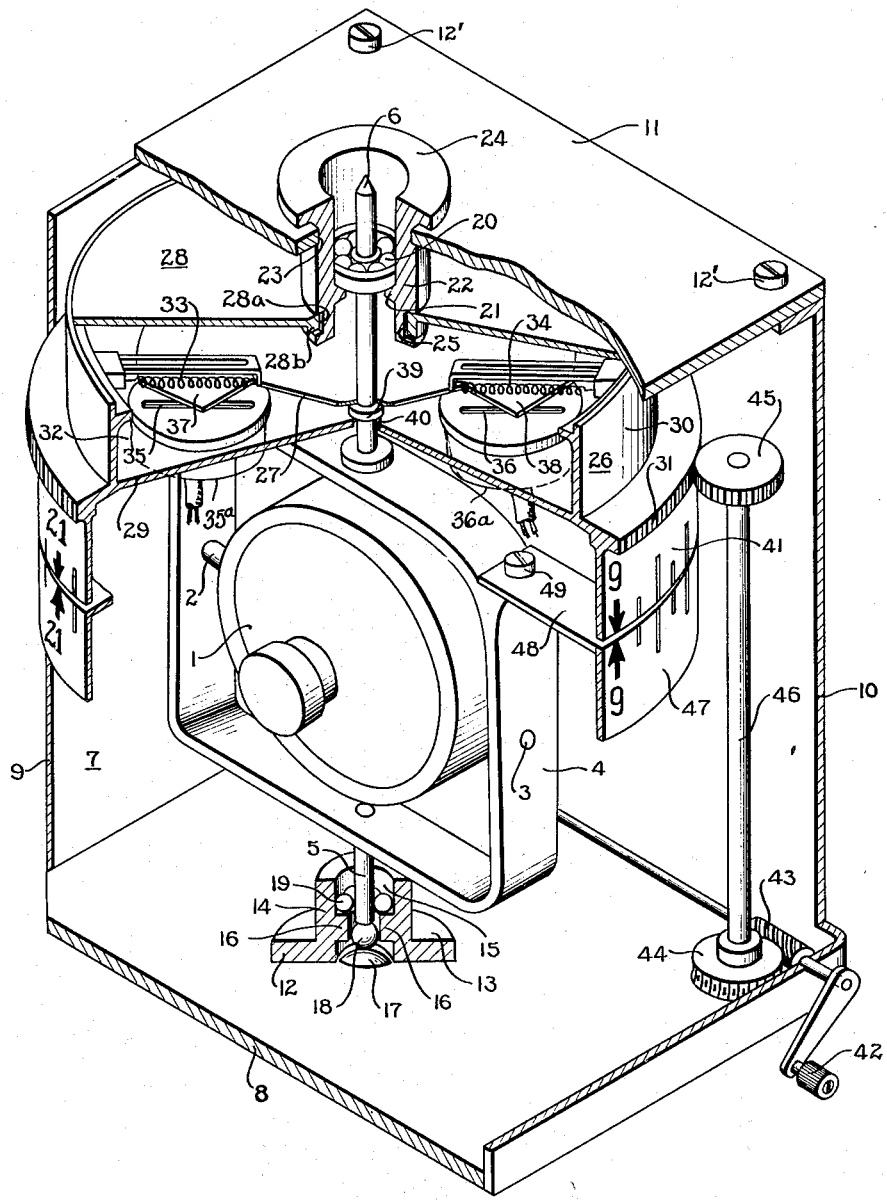
INVENTORS
Heinrich Roland, Friedrich Lauck
BY   and Bruno Schnappuelle
Stephen Cerstvik
ATTORNEY Patented Oct. 29, 1940

2,219,964

UNITED STATES PATENT OFFICE 2,219,964

GYRO, AND MORE PARTICULARLY DIRECTIONAL GYRO FOR NAVIGATION OR VEHICLE CONTROL PURPOSES

Heinrich Roland, Berlin-Steglitz, Bruno Schnapperelle, Berlin-Zehlendorf, and Friedrich Lauck, Lubeck-Travemunde, Germany, assignors to Siemens Apparate und Maschinen Gesellschaft mit beschrankter Haftung, Berlin, Germany, a corporation of Germany Application May 10, 1939, Serial No. 272,904
In Germany April 25, 1938

2 Claims. (Cl. 33—204)

This invention relates to gyros, and more particularly to directional gyros for navigation or vehicle control purposes.

One of the objects of the present invention is to provide a novel gyro and course setting and controlling arrangement which occupies a minimum amount of space.

Another object of the invention is to provide a gyro of the above character having a novel course setting and controlling device in combination therewith, and a compass rose or an indicator novelly disposed relative to the gyro and device.

A further object is to provide a gyro arrangement of the above character the parts of which may be removed simultaneously from a housing therefor.

An additional object is to provide a novel course control gyro having a course adjusting compass rose disposed in a novel manner relative to a gyro compass rose.

The above and further objects and novel features will more fully appear when the same is read in connection with the accompanying drawing. It is to be expressly understood, however, that the drawing is for purposes of illustration only and is not intended as a definition of the limits of the invention, reference for the latter purpose being had to the appended claims.

The drawing is a perspective view partly in section and with parts broken away illustrating one embodiment of the invention.

The form of the invention illustrated in the accompanying drawing, by way of example, comprises a directional or control gyro with a horizontal axis of rotation in gimbal ring suspension, the gyro being adaptable for governing the course of a vehicle such as an aircraft.

The directional or control values provided by the gyro are transferred from the gyro proper by means of a course setting and controlling device which preferably transforms said values into electrical magnitudes. The course setting and controlling means must operate with as little friction as possible in order to eliminate reactions upon the gyro which in itself does not possess a directing moment. The course setting and controlling means for the angular gyro motion, i. e., angular motion of the vehicle relative to said gyro, comprises in the form shown, a bolometer arrangement having an active member drivably connected to a trunnion of the gimbal suspension, and a passive member which is angularly adjustable in accordance with a desired course which is to be followed by the craft and which is mounted upon an outer housing in a manner to later appear.

In order that a desired course for the craft may be adjusted on the apparatus, which course the craft will be caused to follow by a suitable rudder control device (not shown), an indicator or compass rose is mounted upon said angularly adjustable passive member. A second compass rose or indicator is provided which is mounted upon the gimbal ring suspension adjacent the first indicator and adapted for movement in azimuth with the gyro rotor. The compass roses, the course setting and controlling means and the gyro, including the suspension therefor, are mounted in a compact manner within the outer housing whereby a minimum space is occupied by the entire apparatus.

In the figure a gyro rotor (not shown) having the axis of rotation thereof horizontally disposed, is mounted in a housing 1 having inner horizontal trunnions 2 and 3. The latter are conventionally mounted in a gimbal frame 4 which in turn is provided with vertical outer trunnions 5 and 6.

A housing 7 for the gyro rotor and suspension therefor is provided having a base 8, side faces 9, 10 and a top cover 11, the latter being secured to the side faces, for example, by screws 12'.

A suitable bearing for the lower trunnion 5 is provided comprising, for example, a foot step bearing 12 having an annular base 13 and a vertical neck 14 through which a bore 15 extends, a suitable inner shoulder 16 restricting the bore adjacent the lower portion thereof. A resilient dome member 17 is provided at the lower extremity of the bore, upon which a ball 18 rests. Upon the latter rests the lower face of trunnion 5. Suitable ball bearings 19 are supported upon the shoulder 16 for maintaining the trunnion in a centralized position in the bore.

The other vertical trunnion 6 is mounted in a suitable collar bearing 20 which rests upon an inner shoulder or flange 21 within a sleeve 22. The latter extends through a bore 23 in the cover 11 and is supported upon the cover by a flange 24. An annular groove 25 is provided in the outer surface of the sleeve preferably adjacent the lower extremity thereof for a purpose to appear later.

Novelly disposed course setting and controlling means are provided comprising, in the form shown, a bolometer arrangement which is operatively connected to suitable means (not shown) for positioning a course control surface of the craft whereby the longitudinal axis of the craft may be maintained in a predetermined relation with the axis of rotation of the gyro. The bolometer arrangement is constituted by a passive member 26 which normally moves with the craft, and an active member 27 which is mounted upon the trunnion 6 and which moves therewith. Member 26 is preferably constituted by a pair of discs 28, 29 concentric with trunnion 6, mounted in parallel relationship, and firmly connected to a cylindrical element 30, one at each extremity thereof. At the center of disc 28 is a circular aperture 28a having around the lower lip thereof an annular flange 28b. The disc is rotatably supported upon sleeve 22 by said flange which engages the lower face of groove 25 of the sleeve. Disc 29 may be integral with element 30, and for a purpose to appear later is provided with a toothed outer rim 31. Between discs 28, 29 is formed a bolometer chamber 32 having mounted diametrically opposed therein two bolometer filaments 33 and 34 which are disposed in a conventional manner in the path of fluid flow from slots 35, 36, respectively.

Fluid flow is supplied to slots 35 and 36, which extend through the disc 29, in the direction of the filaments 33 and 34, in any well-known manner such, for example, as that disclosed in the patent issued to Helmut Sell, No. 1,944,721. The slots 35 and 36 communicate with closed chambers 35a and 36a depending from the bottom of disc 29 and generally provided with vibratable diaphragms which suck in air from chamber 32 and expel it into the chamber in the direction of filaments in the manner well-known in the art as evidenced by Sell, above referred to.

In order that any angular movement of the craft about the vertical axis thereof relative to the gyro may be instantly detected by the bolometer arrangement, the active member 27 is provided comprising a double arm member, the arms being diametrically opposed and having valve gate members 37, 38, one upon each arm. Gate members 37, 38 are preferably V-shaped and adapted for obstructing the flow of fluid to the filaments an equal amount when in a centralized position. Member 27 is secured to trunnion 6 by means of a collar 39 which is preferably beneath the member and immediately above a circular central aperture 40 in disc 29, the diameter of the aperture being less than that of collar 39 in order that an upper margin of the aperture can engage the collar 39 when the course setting and controlling device is removed, and thus enable the simultaneous removal of the last-named device and the gyro rotor and suspension. Since sleeve 22 is mounted on plate 11, and since the member 26 of the course setting and controlling means is mounted upon the sleeve as above set forth, a lifting of plate 11 will accomplish the simultaneous removal of said parts of the apparatus.

Indicating means for showing the angular position of the disc 29, i. e., its position in azimuth, are provided comprising a compass rose 41 which is preferably integral with the disc and which depends therefrom in the form of a flange which is concentric with the trunnions 5, 6. As above mentioned the member 26 is angularly shiftable upon the sleeve 22. Means are provided for controlling the angular position of this member, for example, comprising a handcrank 42 which by means of a worm and wheel 43, 44 governs a spur gear 45 upon a shaft 46, said gear meshing with the toothed rim 31.

Novelly arranged immediately beneath and concentric with rose 41 is a second indicator 47, for example, similarly calibrated in degrees for indicating the position in azimuth of the axis of rotation of the gyro rotor, assuming said axis is horizontal. Indicator or compass rose 47 is mounted by suitable brackets 48 upon frame 4 and there secured by stud bolts 49. Rose 47 is preferably equal in diameter to that of rose 41 and is spaced therefrom a small distance sufficient to preclude the possibility of a frictional engagement therebetween.

In operation the rose 41 is adjusted by means of crank 42 to a desired course. This adjustment will most likely not bring the slots 35, 36 to a centralized position beneath gate valves 37, 38, consequently one of the filaments will be exposed to the fluid flow escaping from one of said slots therebeneath. The resistance of the exposed filament will therefore change and unbalance a suitable control circuit (not shown) whereby a control surface of the craft is changed in position to cause the craft, the housing 7, and hence the slots 35, 36 in the passive member 26 to shift angularly and thereby to move until directly beneath their respective gate valves in a centralized relationship. When this condition exists the relative angular motion will cease until the centralized relationship is destroyed.

There is thus provided novel means for controlling the course of a vehicle which means are compactly arranged and which therefore require only a very small amount of space. The parts of the apparatus are so associated that upon the removal of the cover plate the gyro proper, and the course setting and controlling means, including both the active and passive elements thereof, together with both the adjustable compass rose, and the gyro rose, can be lifted from the housing without undue stress.

Although only one embodiment of the present invention has been illustrated and described in detail it is to be expressly understood that the same is not limited thereto. For example, instead of employing a bolometer type of course setting and controlling arrangement as above described it is possible to use an electrolyte course setting and controlling system having an active member comprising a disc shaped electrode connected with an outer gimbal trunnion, and a passive member including two counter-electrodes which are mounted for angular adjustment in a manner analogous to that of member 26. Also, a different embodiment of a passive course setting member and a different manner of associating same with a housing may be employed. For example, a bow-shaped frame instead of a disc-shaped member may be used, the aforedescribed parts being co-ordinated to the bow-shaped frame in a manner analogous to that of the present embodiment. The passive member may also be directly supported on the cover plate, for example, by means of a tubular flange which is rotatably mounted in the cover plate. Various changes may be made in the design and arrangement of the parts without departing from the spirit and scope of the invention as the same will now be understood by those skilled in the art. For a definition of the limits of the invention reference will be had primarily to the appended claims.

What is claimed is:

1. In apparatus of the class described, a directional gyro, means mounting said gyro for three degrees of freedom including outer gimbal trunnions supporting a gimbal frame, a housing for said gyro and mounting means, a sleeve member mounted on said housing coaxial of said outer trunnions and having a portion thereof extending into said housing, a collar bearing for one of said trunnions supported in said sleeve, a passive course setting member having rigidly connected upper and lower plates, one of said plates being rotatably mounted by and upon said sleeve member, the other plate having a perforation therein through which said one trunnion extends, a ring flange above said perforation and closely adjacent thereto on said last named trunnion, and an active controlling member mounted upon the ring flange and fixed to rotate with said trunnion, said perforation being smaller in diameter than said ring flange.

2. In apparatus of the class described, a directional gyro, means mounting said gyro for three degrees of freedom including outer gimbal trunnions supporting a gimbal frame, a housing for said gyro and mounting means, a sleeve member mounted on said housing coaxial of said outer trunnions and having a portion thereof extending into said housing, a collar bearing for one of said trunnions supported in said sleeve, a passive course setting member having rigidly connected upper and lower plates, one of said plates being rotatably mounted by and upon said sleeve member, the other plate having a perforation therein through which said trunnion extends, electrical resistor means for conducting current therethrough secured within said passive member and between said plates, fluid flow directing means carried by one of said plates at the interior of said passive member for normally directing fluid flow to impinge equally upon said resistor means, a ring flange above said perforation and closely adjacent thereto on said last-named trunnion, an active controlling member mounted upon the ring flange and fixed to rotate with said trunnion, said perforation being smaller in diameter than said ring flange, and means carried by said controlling member normally interposed equally between said resistor means and said fluid flow directing means whereby upon rotation of said last-named trunnion said controlling member is rotated thereby variably directing fluid flow to said resistor means whereby current flow in the latter is varied in accordance with the rotation of said controlling member.

HEINRICH ROLAND.
BRUNO SCHNAPPERELLE.
FRIEDRICH LAUCK.